United States Patent
Hirokami

(10) Patent No.: US 9,828,297 B2
(45) Date of Patent: Nov. 28, 2017

(54) ANTICORROSION AGENT FOR REINFORCED CONCRETE AND CORROSION PREVENTING METHOD

(71) Applicant: SHIN-ETSU CHEMICAL CO., LTD., Tokyo (JP)

(72) Inventor: Munenao Hirokami, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 21 days.

(21) Appl. No.: 15/070,296

(22) Filed: Mar. 15, 2016

(65) Prior Publication Data
US 2016/0280611 A1 Sep. 29, 2016

(30) Foreign Application Priority Data
Mar. 24, 2015 (JP) .................. 2015-060621

(51) Int. Cl.
| | | |
|---|---|---|
| *C23F 11/00* | (2006.01) | |
| *C04B 41/49* | (2006.01) | |
| *C04B 40/00* | (2006.01) | |
| *C04B 41/00* | (2006.01) | |
| *C04B 41/64* | (2006.01) | |
| *C09D 5/08* | (2006.01) | |
| *C04B 111/26* | (2006.01) | |

(52) U.S. Cl.
CPC ...... *C04B 41/4905* (2013.01); *C04B 40/0039* (2013.01); *C04B 41/009* (2013.01); *C04B 41/4922* (2013.01); *C04B 41/64* (2013.01); *C09D 5/08* (2013.01); *C04B 2111/26* (2013.01); *C23C 2222/20* (2013.01)

(58) Field of Classification Search
CPC .............................. C04B 41/4905; C09D 5/08
USPC ........................................................... 422/7
See application file for complete search history.

(56) References Cited

U.S. PATENT DOCUMENTS

| | | |
|---|---|---|
| 6,685,766 B2 | 2/2004 | Standke et al. |
| 2005/0148752 A1* | 7/2005 | Klaassens .......... C08G 59/4085 528/38 |

FOREIGN PATENT DOCUMENTS

| | | |
|---|---|---|
| EP | 1308428 A2 | 5/2003 |
| JP | 4778189 B2 | 9/2011 |
| JP | 5422791 B2 | 2/2014 |

* cited by examiner

*Primary Examiner* — Kevin Joyner
(74) *Attorney, Agent, or Firm* — Birch, Stewart, Kolasch & Birch, LLP

(57) ABSTRACT

An anticorrosion agent comprising
(A) an organosilicon compound of formula (1)

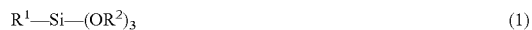

(1)

and
(B) an amine compound of formula (2)

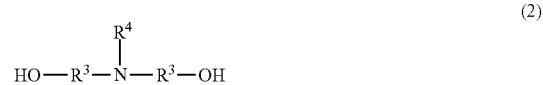

(2)

and/or an amine compound of formula (3)

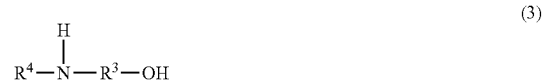

(3)

is applied to steel-reinforced concrete to prevent corrosion of the steel reinforcement.

6 Claims, No Drawings

ANTICORROSION AGENT FOR REINFORCED CONCRETE AND CORROSION PREVENTING METHOD

CROSS-REFERENCE TO RELATED APPLICATION

This non-provisional application claims priority under 35 U.S.C. §119(a) on Patent Application No. 2015-060621 filed in Japan on Mar. 24, 2015, the entire contents of which are hereby incorporated by reference.

TECHNICAL FIELD

This invention relates to an anticorrosion agent and a method for preventing corrosion of steel reinforcement in reinforced concrete.

BACKGROUND ART

Reinforced concrete is a structural member which maintains strength and durability for a long period of time by the mechanism that strong alkali in the concrete forms a passive film on the surface of steel reinforcement for preventing corrosion of the reinforcement.

However, as the concrete is decreased in alkalinity due to neutralization or chloride ions penetrate in the concrete, the passive film on the reinforcement surface is destroyed, allowing the reinforcement to be corroded. Therefore, there is an increasing demand for agents for preventing steel reinforcement in reinforced concrete from corrosion due to such deterioration.

Patent Documents 1 and 2: JP 4778189 and JP 5422791 disclose mixtures of an organosilicon compound and dimethylethanolamine or diethylethanolamine. However, these agents are still insufficient to prevent corrosion of reinforcement. Moreover, diethylethanolamine used as the amine compound is designated to a deleterious substance in the Japanese Cabinet Order for the Designation of the Poisonous and Deleterious Substances.

There is a desire to achieve more effective and safe corrosion prevention of steel reinforcement in reinforced concrete.

CITATION LIST

Patent Document 1: JP 4778189 (U.S. Pat. No. 6,685,766, EP 1308428)
Patent Document 2: JP 5422791

DISCLOSURE OF INVENTION

An object of the invention is to provide an anticorrosion agent and a method for preventing corrosion of steel reinforcement in reinforced concrete.

The inventor has found that this object can be achieved by using a mixture of a specific organosilicon compound and a specific amine compound as the anticorrosion agent for reinforced concrete.

In one aspect, the invention provides an anticorrosion agent for reinforced concrete comprising (A) at least one organosilicon compound having the following formula (1):

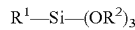

wherein $R^1$ is an alkyl group having at least 3 carbon atoms and $R^2$ is an alkyl group having 1 to 20 carbon atoms, or a (co)hydrolytic condensate thereof, and (B) an amine compound having the following formula (2), an amine compound having the following formula (3) or a mixture thereof,

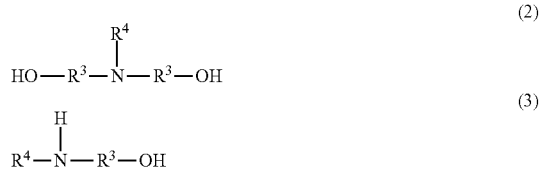

wherein each $R^3$ is independently an alkylene group having 1 to 10 carbon atoms and $R^4$ is hydrogen or an alkyl group having 1 to 10 carbon atoms.

In a preferred embodiment, component (B) is selected from the group consisting of N-methyldiethanolamine, N-ethyldiethanolamine, N-butyldiethanolamine, N-methylethanolamine, N-ethylethanolamine, N-butylethanolamine, and a mixture thereof.

In a preferred embodiment, component (A) is selected from the group consisting of n-propyltrimethoxysilane, n-propyltriethoxysilane, n-butyltrimethoxysilane, n-butyltriethoxysilane, i-butyltrimethoxysilane, i-butyltriethoxysilane, n-hexyltrimethoxysilane, n-hexyltriethoxysilane, n-octyltrimethoxysilane, n-octyltriethoxysilane, i-octyltrimethoxysilane, i-octyltriethoxysilane, n-decyltrimethoxysilane, n-decyltriethoxysilane, and a mixture thereof.

In another aspect, the invention provides a method for preventing corrosion of steel reinforcement in reinforced concrete comprising the step of applying the anticorrosion agent defined above to a surface of the reinforced concrete.

Advantageous Effects of Invention

By applying the anticorrosion agent of the invention to reinforced concrete, it becomes possible to prevent the reinforcement from corrosion.

DESCRIPTION OF PREFERRED EMBODIMENTS

As used herein, the notation (Cn-Cm) means a group containing from n to m carbon atoms per group.

The anticorrosion agent for reinforced concrete according to the invention is defined as comprising (A) at least one organosilicon compound having the following formula (1) or a (co)hydrolytic condensate thereof, and (B) an amine compound having the following formula (2), an amine compound having the following formula (3) or a mixture thereof.

Herein $R^1$ is an alkyl group having at least 3 carbon atoms and $R^2$ is an alkyl group having 1 to 20 carbon atoms.

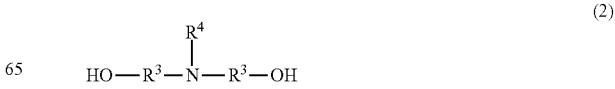

Herein each $R^3$ is independently an alkylene group having 1 to 10 carbon atoms and $R^4$ is hydrogen or an alkyl group having 1 to 10 carbon atoms.

(3)

Herein $R^3$ and $R^4$ are as defined above.

In formula (1), $R^1$ is an alkyl group having at least 3 carbon atoms, preferably 3 to 18 carbon atoms, and more preferably 4 to 10 carbon atoms. Examples include propyl, isopropyl, butyl, isobutyl, tert-butyl, pentyl, neopentyl, hexyl, octyl, isooctyl, decyl, dodecyl, tetradecyl, hexadecyl, and octadecyl. Of these, propyl, butyl, isobutyl, hexyl, octyl, isooctyl, decyl and dodecyl are preferred, with butyl, isobutyl, hexyl, octyl and decyl being more preferred.

$R^2$ is a $C_1$-$C_{20}$ alkyl group, preferably $C_1$-$C_6$ alkyl group. Examples include alkyl groups such as methyl, ethyl, propyl, isopropyl, butyl, isobutyl, tert-butyl, pentyl, neopentyl, hexyl, and octyl and cycloalkyl groups such as cyclohexyl. Of these, methyl and ethyl are preferred, with ethyl being more preferred.

Suitable organosilicon compounds of formula (1) include n-propyltrimethoxysilane, n-propyltriethoxysilane, n-butyltrimethoxysilane, n-butyltriethoxysilane, i-butyltrimethoxysilane, i-butyltriethoxysilane, n-hexyltrimethoxysilane, n-hexyltriethoxysilane, n-octyltrimethoxysilane, n-octyltriethoxysilane, i-octyltrimethoxysilane, i-octyltriethoxysilane, n-decyltrimethoxysilane, n-decyltriethoxysilane, n-dodecyltrimethoxysilane, n-dodecyltriethoxysilane, n-tetradecyltrimethoxysilane, n-tetradecyltriethoxysilane, n-hexadecyltrimethoxysilane, n-hexadecyltriethoxysilane, n-octadecyltrimethoxysilane, and n-octadecyltriethoxysilane. Of these, preferred are n-propyltrimethoxysilane, n-propyltriethoxysilane, n-butyltrimethoxysilane, n-butyltriethoxysilane, i-butyltrimethoxysilane, i-butyltriethoxysilane, n-hexyltrimethoxysilane, n-hexyltriethoxysilane, n-octyltrimethoxysilane, n-octyltriethoxysilane, i-octyltrimethoxysilane, i-octyltriethoxysilane, n-decyltrimethoxysilane, and n-decyltriethoxysilane.

The organosilicon compound of formula (1) wherein $R^1$ is an alkyl group having at least 3 carbon atoms is able to impart hydrophobicity to the surface of reinforced concrete. The preferred organosilicon compound has an alkyl group of at least 4 carbon atoms. The organosilicon compound wherein $R^1$ has two carbon atoms or less fails to impart sufficient hydrophobicity.

In formulae (2) and (3), $R^3$ is a $C_1$-$C_{10}$ alkylene group, for example, methylene, ethylene, propylene, butylene, pentylene, hexylene, octylene, and decylene.

$R^4$ is hydrogen or a $C_1$-$C_{10}$ alkyl group, for example, hydrogen, methyl, ethyl, propyl, butyl, pentyl, hexyl, octyl, and decyl.

Examples of the amine compound of formula (2) include N-methyldiethanolamine, N-ethyldiethanolamine, N-butyldiethanolamine, N-hexyldiethanolamine, N-octyldiethanolamine, and diethanolamine, with N-methyldiethanolamine, N-ethyldiethanolamine and N-butyldiethanolamine being preferred.

Examples of the amine compound of formula (3) include N-methylethanolamine, N-ethylethanolamine, N-butylethanolamine, N-hexylethanolamine, N-octylethanolamine, ethanolamine, propanolamine, butanolamine, hexanolamine, and octanolamine, with N-methylethanolamine, N-ethylethanolamine and N-butylethanolamine being preferred.

The amine compound as component (B) is preferably used in an amount of 0.01% by weight to 20% by weight, more preferably 0.1% by weight to 10% by weight based on the organosilicon compound (A). Less than 0.01% by weight of component (B) may be insufficient to exert the effect of preventing corrosion of steel reinforcement whereas more than 20% by weight of component (B) may detract from the storage stability of the anticorrosion agent.

As long as the objects of the invention are not impaired, the anticorrosion agent may further comprise additives such as solvents, thickening aids, and rust preventives.

Suitable solvents include alcohols such as methanol, ethanol and isopropanol and water. Suitable thickening aids include silica, particulate clays, cellulose derivatives, polyacrylamides, polyvinyl alcohol, and polysaccharides. Suitable rust preventives include carboxylic acids and carboxylic acid salts as well as dinonylnaphthalene sulfonate and alkaline earth metal salts thereof.

The inventive anticorrosion agent may be prepared by stirring the organosilicon compound (A), the amine compound (B), and other additives together. The stirring temperature is preferably 10° C. to 100° C., more preferably 10° C. to 80° C. The stirring time is preferably 10 minutes to 2 hours, more preferably 30 minutes to 1 hour.

In the course of stirring the organosilicon compound (A) and the amine compound (B), transesterification reaction takes place partially between an alkoxysilyl group of the organosilicon compound and an alcohol moiety of the amine compound. In an example wherein n-hexyltriethoxysilane as component (A) and N-methylethanolamine as component (B) are used, the following reaction takes place.

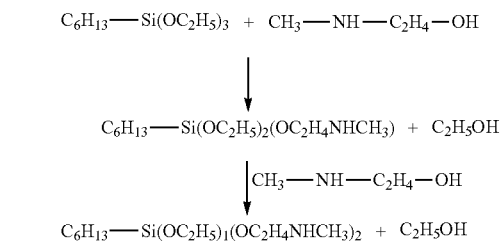

The organosilicon compound (A) undergoes hydrolytic condensation on the reinforced concrete surface to make the concrete surface hydrophobic and prevent water infiltration. The amine compound (B) can attach to the steel reinforcement in the reinforced concrete to prevent corrosion by the ingress of chloride ions or to reduce the corrosion rate even when the reinforcement has been corroded with chloride ions.

After application of the transesterification reaction product between the amine compound (B) and the organosilicon compound (A) to the surface of reinforced concrete, the amine compound generates in the reinforced concrete whose surface has been hydrophobized to prevent outflow of the amine compound from within the concrete, and effectively attaches to the reinforcement.

The anticorrosion agent may be applied to the reinforced concrete surface by any desired coating techniques such as spray coating, wipe coating, brush coating, roll coating, and knife coating. The coating weight is preferably more than 50 g/m², more preferably more than 100 g/m², and most preferably more than 200 g/m². The coating step may be repeated several times at intervals of drying. The upper limit of the (total) coating weight is preferably up to 1,000 g/m², though not critical.

The corrosion state of steel reinforcement in reinforced concrete is generally evaluated by an electrochemical method. Specifically the corrosion state may be examined by determining a self-potential or polarization resistance.

EXAMPLE

Examples of the invention are given below by way of illustration and not by way of limitation. All parts are by weight (pbw). The viscosity is measured at 25° C. by an Ostwald viscometer.

Examples 1 to 15

An organosilicon compound and an amine compound were mixed in amounts (pbw) shown in Tables 1 to 3 and stirred at 40° C. for one hour, obtaining a series of coating agents.

TABLE 1

| (pbw) | Example 1 | Example 2 | Example 3 | Example 4 | Example 5 |
|---|---|---|---|---|---|
| n-Hexyltriethoxysilane | 95 | 95 | 95 | 95 | 95 |
| n-Octyltriethoxysilane | | | | | |
| N-Methyldiethanolamine | 5 | | | | |
| N-Ethyldiethanolamine | | 5 | | | |
| N-Methylethanolamine | | | 5 | | |
| N-Ethylethanolamine | | | | 5 | |
| N-Butylethanolamine | | | | | 5 |
| | Agent 1 | Agent 2 | Agent 3 | Agent 4 | Agent 5 |
| Appearance | Colorless and clear | Colorless and clear | Colorless and clear | Colorless and clear | Colorless and clear |
| Viscosity (mm²/s) | 1 | 1 | 1 | 1 | 1 |

TABLE 2

| (pbw) | Example 6 | Example 7 | Example 8 | Example 9 | Example 10 |
|---|---|---|---|---|---|
| n-Hexyltriethoxysilane | | | | | |
| n-Octyltriethoxysilane | 95 | 95 | 95 | 95 | 95 |
| N-Methyldiethanolamine | 5 | | | | |
| N-Ethyldiethanolamine | | 5 | | | |
| N-Methylethanolamine | | | 5 | | |
| N-Ethylethanolamine | | | | 5 | |
| N-Butylethanolamine | | | | | 5 |
| | Agent 6 | Agent 7 | Agent 8 | Agent 9 | Agent 10 |
| Appearance | Colorless and clear | Colorless and clear | Colorless and clear | Colorless and clear | Colorless and clear |
| Viscosity (mm²/s) | 2 | 2 | 2 | 2 | 2 |

TABLE 3

| (pbw) | Example 11 | Example 12 | Example 13 | Example 14 | Example 15 |
|---|---|---|---|---|---|
| n-Propyltriethoxysilane | 95 | | | | |
| n-Butyltriethoxysilane | | 95 | | | |
| i-Butyltriethoxysilane | | | 95 | | |
| Decyltriethoxysilane | | | | 95 | |
| Dodecyltriethoxysilane | | | | | 95 |
| N-Ethyldiethanolamine | 5 | 5 | 5 | 5 | 5 |
| | Agent 11 | Agent 12 | Agent 13 | Agent 14 | Agent 15 |
| Appearance | Colorless and clear | Colorless and clear | Colorless and clear | Colorless and clear | Colorless and clear |
| Viscosity (mm²/s) | 1 | 1 | 1 | 30 | 45 |

Comparative Examples 1 to 8

An organosilicon compound and an amine compound were mixed in amounts (pbw) shown in Tables 4 and 5 and stirred at 40° C. for one hour, obtaining coating agents.

TABLE 4

| (pbw) | Comparative Example | | | | | |
|---|---|---|---|---|---|---|
| | 1 | 2 | 3 | 4 | 5 | 6 |
| n-Hexyltriethoxysilane | 95 | 95 | 100 | | | |
| n-Octyltriethoxysilane | | | | 95 | 95 | 100 |
| Dimethylethanolamine | 5 | | | 5 | | |
| Diethylethanolamine | | 5 | | | 5 | |
| | Agent 16 | Agent 17 | Agent 18 | Agent 19 | Agent 20 | Agent 21 |
| Appearance | Colorless and clear | Colorless and clear | Colorless and clear | Colorless and clear | Colorless and clear | Colorless and clear |
| Viscosity (mm²/s) | 1 | 1 | 1 | 2 | 2 | 2 |

TABLE 5

| (pbw) | Comparative Example | |
|---|---|---|
| | 7 | 8 |
| Methyltriethoxysilane | 95 | |
| Ethyltriethoxysilane | | 95 |
| N-Ethyldiethanolamine | 5 | 5 |
| | Agent 22 | Agent 23 |
| Appearance | Colorless and clear | Colorless and clear |
| Viscosity (mm²/s) | 1 | 1 |

Examples 16 to 30 and Comparative Examples 9 to 16

A reinforced concrete test block (10 cm×10 cm×10 cm) having an inherent salt content of 8.0 kg/m², a water/cement (W/C) weight ratio of 1/2, and 3 cm steel reinforcement buried was provided. The coating agent was sprayed on the test block in a coating weight of 200 g/m² and dried for 2 hours. This spraying and drying process was repeated twice. Then, the surface of the concrete was measured for a contact angle with water using a contact angle meter (Kyowa Interface Science Co., LTD.). The results are shown in Table 6.

The reinforced concrete test blocks treated with the coating agents were aged at 25° C. and a humidity of 90% RH. The corrosion current density (µA/cm²) was measured at the initial (before the treatment) and 2 weeks and 8 weeks after the treatment by a portable corrosion rate meter CM-V (Shikoku Research Institute Inc.). The results are shown in Table 6.

According to the guidelines of CEB (European Committee for Concrete), a corrosion current density of less than 0.2 µA/cm² indicates that the steel reinforcement is in a passive state, a current density of 0.2 to 0.5 µA/cm² indicates a low to moderate corrosion rate, a current density of 0.5 to 1.0 µA/cm² indicates a moderate to high corrosion rate, and a current density greater than 1.0 µA/cm² indicates an extreme corrosion rate.

As seen from the results in Table 6, even when steel reinforcement in reinforced concrete has already been corroded with chloride ions, the treatment of reinforced concrete with the anticorrosion agent is effective for reducing the corrosion of reinforcement to a passive state after 2 weeks from the treatment.

TABLE 6

| | Test sample | | Water contact angle (°) | Corrosion current density (µA/cm²) | | |
|---|---|---|---|---|---|---|
| | | | | Initial | 2 weeks | 8 weeks |
| Example | 16 | Agent 1 | 102 | 0.75 | 0.18 | 0.08 |
| | 17 | Agent 2 | 104 | 0.80 | 0.20 | 0.10 |
| | 18 | Agent 3 | 105 | 0.76 | 0.15 | 0.05 |
| | 19 | Agent 4 | 103 | 0.77 | 0.20 | 0.10 |
| | 20 | Agent 5 | 106 | 0.80 | 0.19 | 0.09 |
| | 21 | Agent 6 | 110 | 0.79 | 0.16 | 0.05 |
| | 22 | Agent 7 | 111 | 0.79 | 0.17 | 0.06 |
| | 23 | Agent 8 | 111 | 0.80 | 0.18 | 0.09 |
| | 24 | Agent 9 | 110 | 0.76 | 0.19 | 0.09 |
| | 25 | Agent 10 | 112 | 0.77 | 0.19 | 0.05 |
| | 26 | Agent 11 | 70 | 0.78 | 0.18 | 0.06 |
| | 27 | Agent 12 | 90 | 0.80 | 0.17 | 0.05 |
| | 28 | Agent 13 | 90 | 0.81 | 0.17 | 0.06 |
| | 29 | Agent 14 | 115 | 0.79 | 0.18 | 0.05 |
| | 30 | Agent 15 | 118 | 0.80 | 0.17 | 0.06 |
| Comparative Example | 9 | Agent 16 | 101 | 0.80 | 0.55 | 0.33 |
| | 10 | Agent 17 | 100 | 0.80 | 0.53 | 0.33 |
| | 11 | Agent 18 | 101 | 0.80 | 0.55 | 0.34 |
| | 12 | Agent 19 | 105 | 0.80 | 0.54 | 0.30 |
| | 13 | Agent 20 | 104 | 0.80 | 0.51 | 0.30 |
| | 14 | Agent 21 | 105 | 0.80 | 0.54 | 0.36 |
| | 15 | Agent 22 | 40 | 0.80 | 0.30 | 0.22 |
| | 16 | Agent 23 | 45 | 0.80 | 0.31 | 0.21 |

Japanese Patent Application No. 2015-060621 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An anticorrosion agent for reinforced concrete comprising
   (A) at least one organosilicon compound having the following formula (1):

$$R^1\text{—}Si\text{—}(OR^2)_3 \quad (1)$$

wherein $R^1$ is an alkyl group having at least 3 carbon atoms and $R^2$ is an alkyl group having 1 to 20 carbon atoms, or a (co)hydrolytic condensate thereof, and (B) an amine compound having the following formula (2):

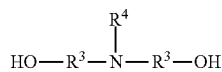 (2)

wherein each $R^3$ is independently an alkylene group having 1 to 10 carbon atoms and $R^4$ is hydrogen or an alkyl group having 1 to 10 carbon atoms.

2. The anticorrosion agent of claim 1 wherein component (B) is selected from the group consisting of
N-methyldiethanolamine,
N-ethyldiethanolamine,
N-butyldiethanolamine,
N-methylethanolamine,
N-ethylethanolamine,
N-butylethanolamine, and
mixtures thereof.

3. The anticorrosion agent of claim 1 wherein component (A) is selected from the group consisting of
n-propyltrimethoxysilane,
n-propyltriethoxysilane,
n-butyltrimethoxysilane,
n-butyltriethoxysilane,
i-butyltrimethoxysilane,
i-butyltriethoxysilane,
n-hexyltrimethoxysilane,
n-hexyltriethoxysilane,
n-octyltrimethoxysilane,
n-octyltriethoxysilane,
i-octyltrimethoxysilane,
i-octyltriethoxysilane,
n-decyltrimethoxysilane,
n-decyltriethoxysilane, and
mixtures thereof.

4. The anticorrosion agent of claim 1, wherein $R^4$ is an alkyl group having 1 to 10 carbon atoms.

5. The anticorrosion agent of claim 4, wherein $R^4$ is methyl, ethyl, propyl, butyl, pentyl, hexyl, octyl, or decyl.

6. A method for preventing corrosion of steel reinforcement in reinforced concrete comprising the step of
applying the anticorrosion agent of claim 1 to a surface of the reinforced concrete.

* * * * *